US010788242B2

(12) United States Patent
Jäger

(10) Patent No.: US 10,788,242 B2
(45) Date of Patent: Sep. 29, 2020

(54) APPARATUS FOR CLEANING SURFACES

(71) Applicant: Anton Jäger, Senden (DE)

(72) Inventor: Anton Jäger, Senden (DE)

( * ) Notice: Subject to any disclaimer, the term of this patent is extended or adjusted under 35 U.S.C. 154(b) by 187 days.

(21) Appl. No.: 15/600,450

(22) Filed: May 19, 2017

(65) Prior Publication Data

US 2018/0003413 A1   Jan. 4, 2018

(30) Foreign Application Priority Data

May 23, 2016   (DE) ...................... 10 2016 109 4021

(51) Int. Cl.
| | |
|---|---|
| *A47L 1/02* | (2006.01) |
| *F24S 40/20* | (2018.01) |
| *H02S 40/10* | (2014.01) |
| *B08B 1/00* | (2006.01) |
| *B08B 1/04* | (2006.01) |
| *B25J 9/00* | (2006.01) |
| *E04G 23/00* | (2006.01) |

(52) U.S. Cl.
CPC ................ *F24S 40/20* (2018.05); *A47L 1/02* (2013.01); *B08B 1/002* (2013.01); *B08B 1/008* (2013.01); *B08B 1/04* (2013.01); *B25J 9/0078* (2013.01); *H02S 40/10* (2014.12); *E04G 23/002* (2013.01); *Y02E 10/40* (2013.01)

(58) Field of Classification Search
CPC .. A47L 1/02; A47L 11/38; F24S 40/20; H20S 40/10
See application file for complete search history.

(56) References Cited

U.S. PATENT DOCUMENTS

| 2013/0037051 A1* | 2/2013 | Eitelhuber | ........ H01L 21/67046 |
| | | | 134/6 |
| 2013/0305474 A1 | 11/2013 | Meller et al. | |
| 2016/0144870 A1* | 5/2016 | Eitelhuber | .............. B08B 1/002 |
| | | | 104/118 |

(Continued)

FOREIGN PATENT DOCUMENTS

| CH | 706552 A2 | 11/2013 |
| CN | 101554892 B | 4/2012 |
| DE | 19653697 C1 | 4/1998 |

(Continued)

OTHER PUBLICATIONS

German Patent and Trademark Office, Search Report, dated May 4, 2017.

*Primary Examiner* — Randall E Chin
(74) *Attorney, Agent, or Firm* — Dinsmore & Shohl LLP

(57) ABSTRACT

An apparatus for cleaning a surface of solar collectors or photovoltaic installations includes at least one cleaning head that comprises at least one cleaning member. The cleaning member can be set into rotation. The apparatus also includes a movement device for moving the cleaning head over at least a part of the surface to be cleaned. The movement device has a first movement unit movable in a first direction and a second movement unit. The cleaning head is movable transversely or obliquely to the first movement direction by the second movement unit along a guide that is connected to the first movement unit. A drive device that is arranged at the first and/or second movement units makes it possible to automatically move the first movement unit in dependence on a position of the second movement unit.

26 Claims, 2 Drawing Sheets

(56) References Cited

U.S. PATENT DOCUMENTS

2017/0272030 A1* 9/2017 Chow .................. H02S 40/12

FOREIGN PATENT DOCUMENTS

| | | |
|---|---:|---:|
| DE | 197 15 563 A1 | 10/1998 |
| DE | 10317479 A1 | 11/2004 |
| DE | 202010010541 U1 | 10/2010 |
| DE | 202010013883 U1 | 12/2010 |
| DE | 202010015730 U1 | 2/2011 |
| DE | 102010006531 A1 | 8/2011 |
| DE | 102010033800 A1 | 2/2012 |
| DE | 10 2012 002 881 A1 * | 8/2013 |
| DE | 102012002046 A1 | 8/2013 |
| EP | 1 840 073 A1 | 10/2007 |
| EP | 2437001 A1 | 4/2012 |
| FR | 3 010 644 A1 | 3/2015 |
| JP | S62117653 A | 5/1987 |
| NL | 1040526 C | 6/2015 |
| WO | 2011148004 A1 | 12/2011 |

* cited by examiner

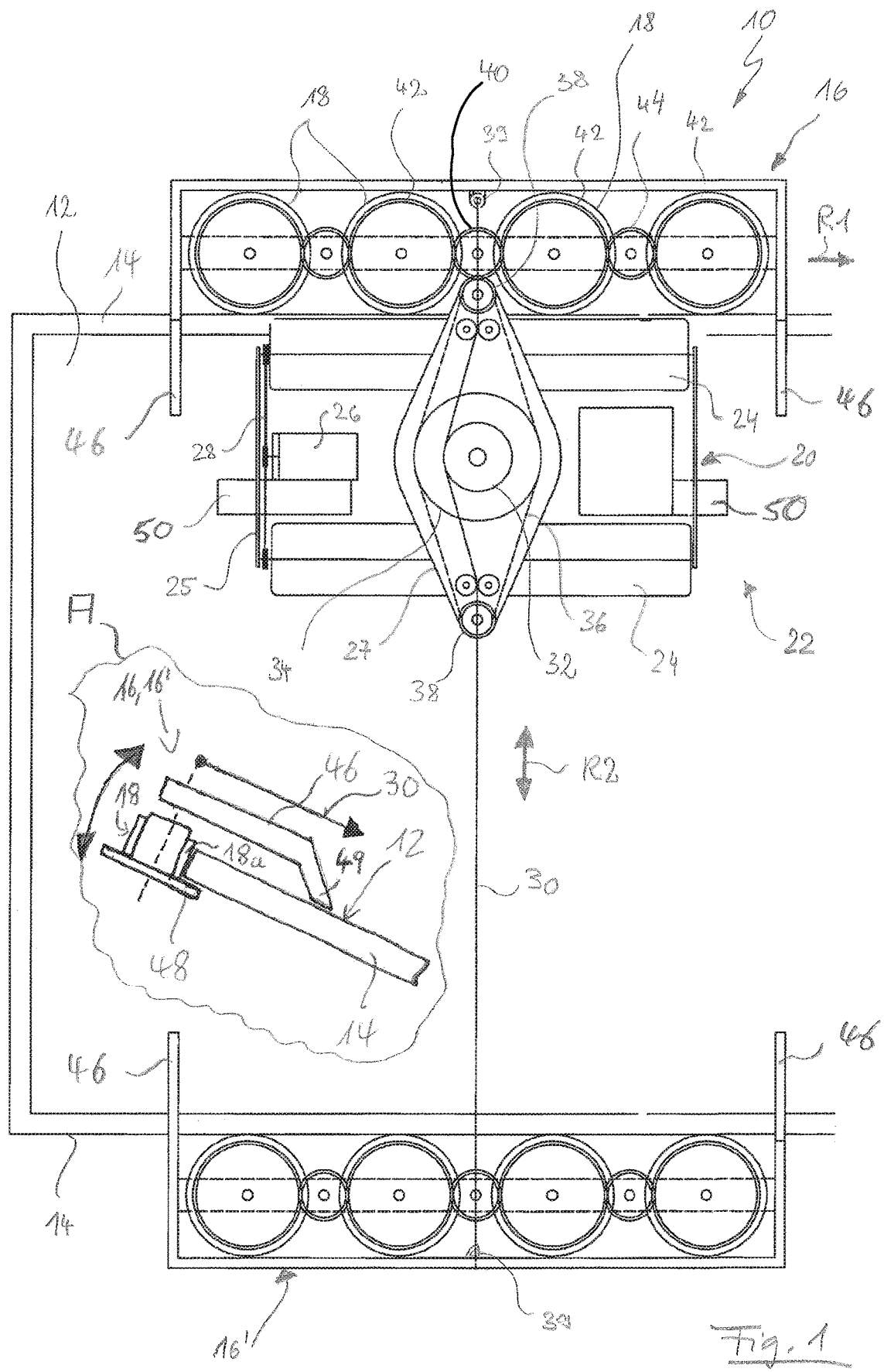

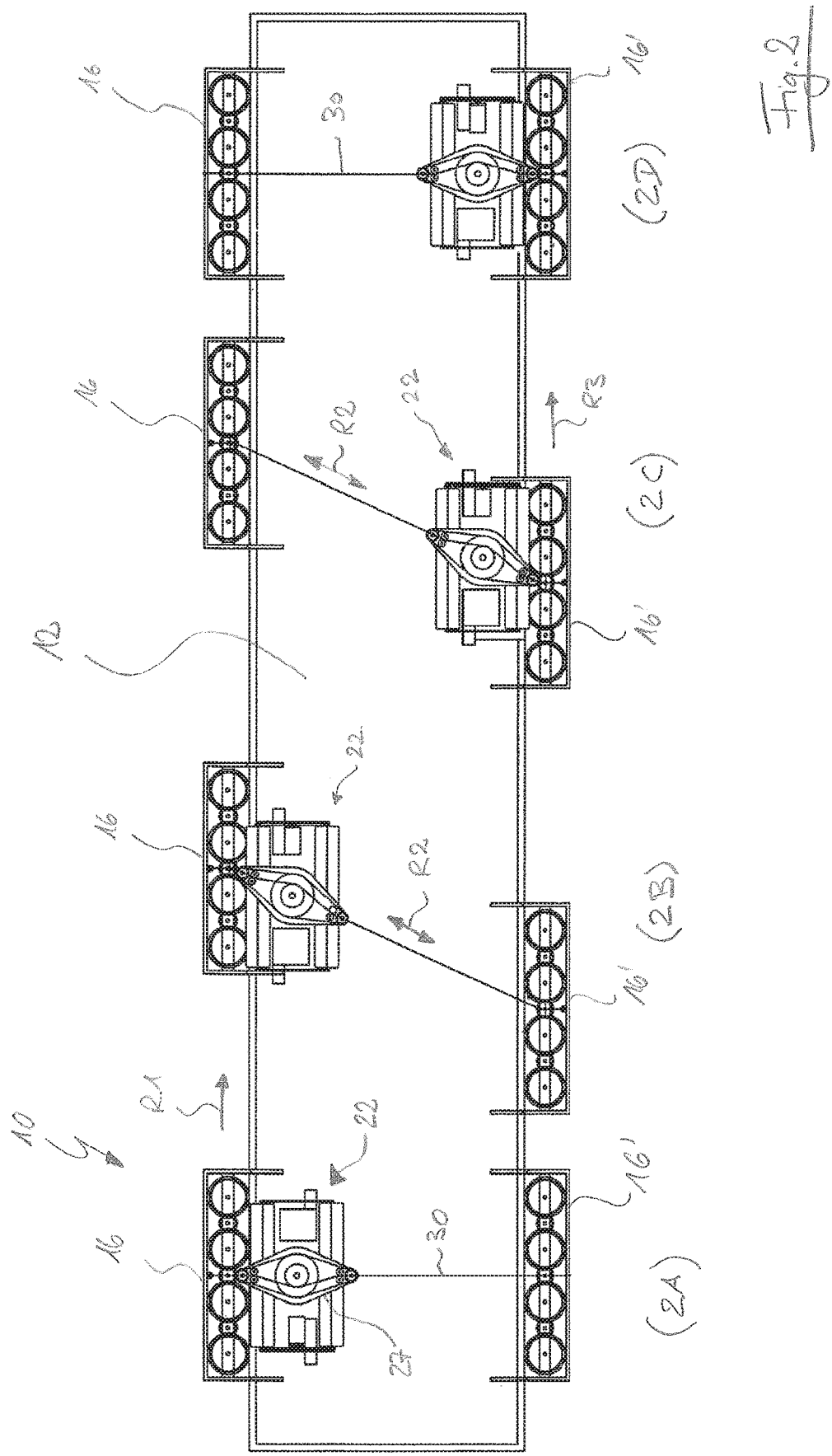

APPARATUS FOR CLEANING SURFACES

CROSS-REFERENCE TO RELATED APPLICATIONS

This application is claims priority to German Patent Application DE 1 020161 094021 filed May 23, 2016.

TECHNICAL FIELD

The present disclosure relates to an apparatus for cleaning surfaces, in particular at solar collectors or photovoltaic installations.

BACKGROUND

The cleaning of large surfaces is a complex and therefore expensive matter in many cases. The cleaning of solar collectors and photovoltaic installations, however, in particular has great importance in practice. A contamination of their surface namely has a directly disadvantageous effect on the efficiency of the installation.

Cleaning apparatus of the kind discussed here are e.g. known from DE 202010015730U, DE 102012002046A, DE 102010033800A, CH 706552A, DE 102010006531A, CN 101554892B, WO 2011/148004A, DE 10317479A, DE 202010010541 U, DE 202010013883U, EP 2437001A, DE 19653697C, NL 1040526C and JP 62117653A.

Not only a good cleaning effect is of importance in the cleaning of such installations, but also and above all that the purchase and the operation of a suitable cleaning apparatus are as inexpensive as possible so that an operation of the solar collectors and photovoltaic installations that is as economic as possible can be achieved overall.

It is therefore an object of the present disclosure to provide an apparatus of the initially named kind that enables a cleaning of the surface to be cleaned that is as efficient as possible.

SUMMARY

In accordance with the present disclosure, the cleaning apparatus comprises at least one cleaning head that has at least one cleaning member. The cleaning member, for example, comprises at least one brush that can set into rotation. A movement device is furthermore provided for moving the cleaning or over at least a part of the surface to be cleaned. The movement device has a first movement unit movable in a first direction and a second movement unit. The cleaning head is movable transversely or obliquely to the first movement direction by means of the second movement unit along a guide means that is connected to the first movement unit. In addition, a control means is provided which is arranged at the first and/or second movement units and by which the first movement unit is automatically movable in dependence on a position of the second movement unit.

In other words, the apparatus is configured such that, on a reaching of a specific position of the second movement unit, a movement of the first movement unit automatically takes place without an operator having to intervene. The control means provides a movement of the first movement unit without any outside intervention simply in that a reaching of a predefined position of the second movement is recognized, for example when it approaches or contacts the first movement unit. Since the two movement units have different movement directions, the cleaning head can be guided step-wise over the surface to be cleaned.

Further embodiments of the present disclosure are set forth in the claims, in the description and in the enclosed drawings.

In accordance with an embodiment of the present disclosure, the control means has a proximity and/or contact switch or a corresponding sensor that effects a drive of the first movement unit on an approach and/or a contact of the movement units. The control means can generally be a simple switch. A corresponding switch or sensor can also work contactlessly. The switch or sensor only serves to detect a position of the second movement unit. A corresponding signal is then converted into a drive of the first movement unit by the control means. The control means is, for example, an electrical contact that is established on an approach of the two movement units, whereby a circuit for driving the first movement unit is closed.

Alternatively, the control means can comprise a mechanical drive device which is provided at the second movement unit and with which the first movement unit is drivable to make a movement on a contact of the movement units. The drive device is, for example, drive effectively coupled to a drive of the second movement units. In this case, the first movement unit is ultimately driven by the drive of the second movement unit to make a movement in the first movement direction. A separate drive for the first movement unit is then not absolutely necessary.

The drive device in particular comprises a gear that, on a contact of the movement units, is in engagement with a drive element, in particular with a gear of the drive of the first movement unit.

In accordance with an advantageous embodiment, the control means comprises a controlling means with which a drive of the first movement unit can be interrupted with a time delay and/or after the traveling of a predetermined distance. I.e. the movement of the first drive unit is restricted to give the second movement unit another opportunity to move along the guide means and thereby to cover the surface to be cleaned step-wise. The controlling means can e.g. be a sensor or a switch or an electronic time or distance detection device.

The control means can also be configured such that a reversal of the drive of the second movement unit can be effected with a time delay and/or after the traveling of a predefined distance of the first movement unit. This embodiment is in particular advantageous when the control means comprises the above-described drive device. It can be effected by a reversal of the drive of the second movement unit that the second movement unit again moves away from the first drive unit to clean surface sections not yet cleaned. In other words, the second movement unit is thereby again moved out of the position effecting the automatic movement of the first movement unit.

In a practically particularly advantageous embodiment, the cleaning head is arranged at the second movement unit. An element of the second movement unit cooperating with the guide means can be pivotable relative to a base carrying the cleaning head in order also to be able to always maintain a preferred position of the cleaning head in the different operating states.

A pivotability is possible, but not absolutely necessary, if in accordance with an embodiment of the present disclosure, the cleaning head or the base carrying the cleaning head is configured such that the cleaning head can carry out a respective cleaning in accordance with its intended purpose in any position or at least in a plurality of different positions.

The cleaning head can in particular have an oval or a circular base surface and/or can be provided with a cleaning member, e.g. with a so-called dishwasher brush, designed in such a manner that can be set into rotation about an axis extending perpendicular to the surface to be cleaned.

The first and/or second movement units can be driven electrically, hydraulically and/or pneumatically. The same applies to the cleaning member. It is understood that the different drive types can be combined with one another. It is, for example, advantageous in many cases if the second movement unit and the cleaning member can be hydraulically moved or driven. The drives of the cleaning member and of the second movement unit can be operated as required and—if desired—independently of one another through suitable valve arrangements. On a use of water as the hydraulic drive means, it can also simultaneously be used for cleaning the surface. With an electric drive of the first and/or second movement units and/or of the cleaning member, the provision of an energy store and/or of a photovoltaic unit is advantageous. At least some of the current required for the operation of the apparatus can thus be provided by the apparatus itself.

The guide means can be pivotable relative to the first movement unit. An angle between the guide means that is in a straight line as a rule and the movement direction of the first movement unit (first direction) is in particular variable in dependence on the operating state of the apparatus. A passive setting of a suitable angle is preferred in this respect. The angle is in particular automatically variable by a movement of the first movement unit.

The guide means can be length variable to take account of the respective operating state of the apparatus.

It is advantageous in many applications if the guide means is a cable or a ribbon. It is, however, by all means conceivable to use a rod—optionally a telescopic rod—or similar, i.e. an at least relatively rigid guide means that can be subjected both to tension and to shear.

In accordance with a further advantageous embodiment, a third movement unit is provided that is movable in a third direction that in particular extends in parallel with the first direction. The third movement unit is also connected to the guide means. A further control means that is arranged at the third and/or second movement units makes it possible to automatically move the third movement unit in dependence on a position of the second movement unit. The third movement unit is in particular configured similar to the first movement unit.

On a spatial spacing of the first and third movement units, the second movement unit can be movable to and fro along the guide means, with it providing a traveling of the first and third movement units respectively in respective specific positions, in particular on an approach to and/or on a contact with the first or third movement units. The surface to be cleaned can thereby be covered step-wise in an efficient manner.

The present disclosure further relates to a system having solar collectors or a photovoltaic installation and having an apparatus in accordance with at least one of the above-described embodiments.

In accordance with a constructionally simple embodiment of the system, the first movement unit and/or—if present—the third movement unit is/are guided along a frame, in particular an outer frame, of the surface to be cleaned. The frame can also itself serve as a guide for the first and/or third movement units. With a correspondingly adapted construction of the frame and of the movement unit(s) cooperating with it, the apparatus can be installed and deinstalled in a simple manner as required without cost-driving separate guide devices having to be installed.

The frame is preferably an outer framing, an outer boundary and/or an outer enclosure of the respective surface to be cleaned. The frame is in particular a component of the solar collectors or photovoltaic installation. A component of the installation that is anyway present can hereby be used for the cleaning apparatus or for its movement unit(s) so that it is not necessary to temporarily relocate holders or guides of any design for the movement unit(s) for the cleaning.

BRIEF DESCRIPTION OF THE DRAWINGS

The present disclosure will be described in the following by way of example with reference to an advantageous embodiment and to the enclosed drawings. There are shown:

FIG. 1 an embodiment of a cleaning apparatus in accordance with the present disclosure in a schematic representation; and FIG. 2 the apparatus of FIG. 1 in different operating states.

DETAILED DESCRIPTION

FIG. 1 schematically shows a cleaning apparatus 10 in accordance with the present disclosure at a surface to be cleaned that belongs, for example to solar collectors or to a photovoltaic installation.

The surface 12 is bounded by a frame 14. The cleaning apparatus 10 comprises two wagons 16, 16' that are arranged at the longitudinal sides of the frame 14. The wagons 16, 16' each have a plurality of rollers 18 by means of which the wagons 16, 16' are guided in a travelable manner at the frame 14.

A cleaning head 20 of the apparatus 10 is arranged at a carriage 22. The cleaning head 20 comprises two cleaning rolls 24 that can be driven with the aid of a motor 26 via a belt 28 to make rotary movements to clean the surface 12. The rolls 24 are held by a carrier frame-like base 25 of the carriage 22 and the base also carries a guide element 27 supported pivotably with respect to the base 25. The structure and the function of the guides 27 will be explained more precisely in the following.

As was already initially mentioned, it is important for an efficient operation of solar collectors or photovoltaic installations to regularly clean the corresponding collector surfaces. This should take place automatically where possible to keep the operating costs of the installation low. I.e. the interventions required by an operator for the cleaning of the surfaces 12 should be as minimal as possible.

To be able to clean the surface 12 step-wise and with a minimum use of staff, not only the wagons 16, 16' are movable, but the carriage 22 can also be traveled. It is travelable along a cable 30 (movement direction R2) that is connected to both wagons 16, 16'. The cable 30 cooperates with a roller 32 of the guide element 27. It loops around the roller 32 so that a rotation of the roller 32 results in a travel of the carriage 22. A drive of the roller 32 is not shown in FIG. 1. It is, however, also arranged at the carriage 22.

The roller 32 is rotationally fixedly coupled to a coaxially arranged roller 34 that is in turn drive-effectively connected to gears 38 via a belt 36. I.e. not only a movement of the carriage 22 along the cable 30 guiding the movement of the carriage 22 is effected by a drive of the roller 32 to make a rotary movement, but a rotary movement of the gears 38 is also generated.

If the carriage 22—unlike as shown in FIG. 1—is located in a region between the wagons 16, 16', the rotation of the gears 38 has no particular effect. The carriage 22 is guided at the desired speed over the surface 12 by the rotary movement of the roller 32, with the cleaning rolls 24 of the cleaning head 20 carrying out their cleaning work. It is conceivable to decouple the roller 34 from the roller 32 in this situation.

As soon as the carriage 22 comes into contact with one of the wagons 16, 16', however, the drive of the gears 38 effects a movement of the corresponding wagon 16, 16'. This will be described in the following with reference to the situation shown in FIG. 1 in which the carriage 22 has reached the upper end of its "pendulum movement" between the wagons 16, 16'. The carriage 22 has in this respect approached the wagon 16 so much that the upper gear 38 comes into engagement with a gear 40 that is in drive-effective connection with the rollers 18 via gears 42 and via gears 44 acting as idler gears. A rotary drive movement generated by the drive of the carriage 22 is thus transmitted to the rollers 18, whereby the wagon 16 is traveled on the frame 14. Provision can be made that the roller 32 is actively or passively decoupled from the drive in this state and only the roller 34 is driven.

FIG. 2 shows the process of a step-wise cleaning of the surface 12. The situation represented in FIG. 1 is shown in FIG. 2A. FIG. 2B shows the situation that is adopted after a lateral travel of the wagon 16 on the frame 14 that was effected in the above-described manner. The distance by which the wagon 16 was traveled to the right can be fixed, for example, in that the direction of rotation of the drive of the carriage 22 is reversed after a predetermined time and—if it was decoupled at times—the roller 32 is again drive effectively connected to the drive associated with it. The carriage 22 then moves away from the wagon 16, whereby the gears 38 and 40 are brought out of engagement. The wagon 16 then stops, either by the inner friction of the mechanism of the wagon 16 and/or with the aid of holding or braking means.

The lower carriage 16' has not moved on in the meantime so that the cable 30 is now tensioned obliquely over the surface 12. An accompanying extension of the cable 30 can be permitted by a corresponding configuration of a connection 39 (see FIG. 1) of the cable 30 to the wagon 16 and/or to the wagon 16'. The guide element 27 was pivoted relative to the base 25 by the cable 30 so that the orientation of the base 25 is substantially unchanged.

As can be seen in FIG. 2C, the carriage 22 is subsequently moved downwardly until it comes into contact with the wagon 16'. The lower gear 38 then drives the wagon 16' (in similar manner to the upper gear 38 driving the wagon 16) to make a movement to the right (movement R3) until the state shown in FIG. 2D is reached and the carriage 22 is again set into motion and is traveled along the cable 30 to the wagon 16.

The above-described movement scheme can naturally also be worked through in a reverse direction.

The cleaning apparatus 10 only needs a drive, namely the roller 32, for the movement of the carriage 22 over the surface 12. This drive can be an electric drive, for example. To minimize an external power supply or even to make it obsolete, the apparatus 10 can have its own photovoltaic installation as well as a suitable energy store associated with it. The two named components are in particular arranged at the carriage 22 and/or at the wagons 16, 16'.

Differing from the described embodiment of the cleaning apparatus 10, provision can be made that the cleaning rolls 24 are also driven by the drive of the roller 32. It is, for example, advantageous if the drive is a hydraulic drive. The water used in this respect can be applied over the surface 12 via suitable nozzles after its use as a drive means to improve the cleaning effect of the apparatus 10.

Instead of the cable 30 a rod (optionally a telescopic rod) can also be provided along which the carriage 22 moves, for example with the aid of roller pair gripping around the rod from two sides.

It can be advantageous in certain applications to have the wagons 16, 16' associated with their own drives that are activated as soon as the carriage 22 is located in a predefined position. The activation can take place by proximity switches and/or contact switches or by suitable sensors. It is, for example, conceivable that such a contact switch establishes an electrical contact between an energy supply of the drive of the carriage 22 and the respective drive of the wagons 16, 16'. In this case, the wagons 16, 16' do not require their own power supply.

In an embodiment, not shown, of the cleaning apparatus in accordance with the present disclosure, only one wagon 16 or 16' can also be provided that is e.g. connected to a rigid guide means (e.g. to a rod). The carriage 22 having the cleaning head 20 then travels to and fro along this guide means, with said carriage effecting the movement of the wagon 16 or 16' respectively when it reaches it, such as has been described above in different variants. On a reaching of the other end of the guide means, a reversal of the movement of the carriage 22 can be effected by suitable proximity switches and/or contact switches or sensors provided there. This end of the guide means is advantageously guided and/or supported by its own guide device in the region of the frame 14 (or by the frame 14 itself) in this embodiment. The guide means can also be supported on the surface 12, for example by means of a roller.

As already briefly mentioned above, means—e.g. holding means or braking means—can be provided that ensure that the wagons 16, 16' each remain in their position when they should actually not move along the frame 14, that is in particular when the carriage 22 moves between the wagons 16, 16' to carry out its cleaning work and a movement of the wagons 16, 16' would be a disadvantage.

Such securing means can e.g. be formed by a rubber coating 18a of the rollers 18 that is configured as correspondingly soft or compressible so that the rollers 18 require a specific force or a specific torque to be set into movement that is only applied when the carriage 22 cooperates with the respective wagon 16 or 16' for this purpose. Alternatively or additionally, a targeted stiffness and/or a latching of the rollers 18 can be provided to provide a threshold to be overcome.

Detail A in FIG. 1 shows a further possibility. Beams 46 of the respective wagon 16, 16' and disks 48 of the rollers 18 together form a holding device engaging around the frame 14. The wagon is tiltable to a certain degree on the frame 14, as is indicated by the double arrow. A section of the beam 46 configured as a brake shoe 49 moves into or out of rubbing or adhering engagement with the surface 12 to be cleaned depending on whether the cable 30 is subjected to tension or not with respect to the wagon 16, 16'. The movement of the carriage 22 then therefore itself automatically ensures that the wagon 16, 16' is either braked or movable.

The beams 46 can alternatively or additionally also serve as carriers for—mechanical, electrical and/or optical—sensors, not shown, for the end position recognition by means of which the apparatus can recognize the reaching of an end of the surface 12 to be cleaned—viewed in the respective movement direction of the wagons 16, 16'. Such sensors can alternatively or additionally also be arranged at different positions, e.g. at lateral projections 50 of the carriage 22.

The apparatus can be configured such that a direction reversal of the carriage 22 takes place automatically.

Alternatively, a switching device can be provided for the user. It can be configured as a pulse control and in particular such that a switching process is triggered at the carriage by a switching on and off of the supply of e.g. water that is supplied at pressure to the carriage 22, for example via a pressure washer to which the apparatus is connected. A switching process can also be controlled electrically, e.g. by means of one or more servo motors that are e.g. controlled via an electric line or wirelessly or are triggered mechanically via a load cable guided in parallel with a water hose between the user and the carriage 22 and to be actuated manually.

A valve manifold can e.g. be connected to the carriage 22 in a respective desired working state by means of such switching processes so that, for example, either a first impeller effecting a first movement direction of the carriage 22 or a second impeller effecting an opposite second movement direction of the carriage 22 is selectively acted on in a drive-effective manner by pressurized water via the valve manifold. These impellers can e.g. be formed by the roller 18 (FIG. 1) and can be arranged along the axis of rotation of the roller 18 at a spacing from one another.

REFERENCE NUMERAL LIST 10 cleaning apparatus
12 surface
14 frame
16, 16' wagon
18 roller
18a rubber coating
20 cleaning head
22 carriage
24 cleaning roll
25 base
26 motor
27 guide element
28, 36 belt
30 cable
32, 34 roller
38, 40, 42, 44 gear
46 beam
48 disk
49 brake shoe
50 projection
A detail
R1, R2, R3 movement device

The invention claimed is:

1. An apparatus for cleaning a surface bounded by a frame that includes a first side end and an opposite second side end, the apparatus comprising:
at least one cleaning head that has at least one cleaning member that can be set into rotation, and
a movement device for moving the cleaning head over at least a part of the surface to be cleaned,
wherein the movement device has a first movement unit that only engages with the first side end of the frame and the first movement unit being movable in a first movement direction and a second movement unit, wherein the cleaning head is movable transversely or obliquely to the first movement direction by the second movement unit along a guide that is connected to the first movement unit, wherein the cleaning head is arranged at the second movement unit, and wherein an element of the second movement unit cooperating with the guide is pivotable relative to a base of the second movement unit carrying the cleaning head, and
wherein a drive device is provided, the drive device being arranged at at least one of the first movement unit and the second movement unit and the first movement unit being automatically movable in dependence on a position of the second movement unit by the drive device.

2. The apparatus in accordance with claim 1,
wherein the drive device has a proximity and/or contact switch or a corresponding sensor that effects a drive of the first movement unit on an approach and/or on a contact of the first movement unit and the second movement unit.

3. The apparatus in accordance with claim 1,
wherein the drive device comprises a mechanical drive device, the mechanical drive device being provided at the second movement unit and the first movement unit being drivable with the mechanical drive device to make the movement in the first movement direction on a contact of the first movement unit and the second movement unit.

4. The apparatus in accordance with claim 3,
wherein the mechanical drive device is drive effectively coupled to a drive of the second movement unit.

5. The apparatus in accordance with claim 4,
wherein the mechanical drive device comprises a gear that is in engagement with a drive element of a drive of the first movement unit on a contact of the first movement unit and the second movement unit.

6. The apparatus in accordance with claim 1,
wherein the drive device is configured to interrupt a drive of the first movement unit with a time delay and/or after the traveling of a predefined distance.

7. The apparatus in accordance with claim 1,
wherein the drive device is configured such that a reversal of a drive of the second movement unit can be effected with a time delay and/or after the traveling of a predefined distance.

8. The apparatus in accordance with claim 1,
wherein at least one of the first movement unit and the second movement unit is electrically driven, hydraulically driven and/or pneumatically driven.

9. The apparatus in accordance with claim 1,
wherein the cleaning member is movable by an electric drive, hydraulic drive and/or pneumatic drive.

10. The apparatus in accordance with claim 1,
wherein the apparatus comprises at least one of an energy store and a photovoltaic unit that is coupled to a drive of at least one of the first movement unit and the second movement unit, and the cleaning member.

11. The apparatus in accordance with claim 1,
wherein the guide is pivotable relative to the first movement unit.

12. The apparatus in accordance with claim 1,
wherein the guide is length variable.

13. The apparatus in accordance with claim 1,
wherein the guide is one of a cable and a ribbon.

14. The apparatus in accordance with claim 1,
further comprising a third movement unit, the third movement unit being movable in a third direction, and the third movement unit being connected to the guide, with a further drive device being provided which is arranged at at least one of the third movement unit and the second movement unit and the third movement unit being automatically movable in dependence on a position of the second movement unit with the further drive device.

15. The apparatus in accordance with claim 14,
wherein the surface is present at a solar collector or at a photovoltaic installation, and
wherein at least one of the first movement unit and the third movement unit is provided with a holding device that is configured to engage with the first side end of the frame of the solar collector or the photovoltaic installation in a state arranged at the solar collector or the photovoltaic installation and to permit a limited tiltability of at least one of the first movement unit and the third movement unit.

16. The apparatus in accordance with claim 1,
wherein the surface is present at a solar collector or at a photovoltaic installation, and
wherein the first movement unit is provided with a holding device that is configured to engage around the first side end of the frame, of the solar collector or the photovoltaic installation in a state arranged at the solar collectors or photovoltaic installation and to permit a limited tiltability of the movement unit.

17. The apparatus in accordance with claim 1,
wherein the at least one cleaning member is a brush.

18. An apparatus for cleaning a surface, the apparatus comprising:
at least one cleaning head that has at least one cleaning member that can be set into rotation, and
a movement device for moving the cleaning head over at least a part of the surface to be cleaned,
wherein the movement device has a first movement unit movable in a first movement direction and a second movement unit, wherein the cleaning head is movable transversely or obliquely to the first movement direction by the second movement unit along a cable guide that is connected to the first movement unit, and
wherein a drive device is provided, the drive device being arranged at at least one of the first movement unit and the second movement unit and the first movement unit being automatically movable in dependence on a position of the second movement unit by the drive device
wherein the second movement unit is moveable into a use position in which the second movement unit is spaced apart from the first movement unit and the second movement unit is only connected to the first movement unit by the cable guide.

19. The apparatus in accordance with claim 18,
wherein the cleaning head is arranged at the second movement unit.

20. An apparatus for cleaning a surface, the apparatus comprising:
at least one cleaning head that has at least one cleaning member that can be set into rotation, and
a movement device for moving the cleaning head over at least a part of the surface to be cleaned,
wherein the movement device has a first movement unit movable in a first movement direction and a second movement unit, wherein the cleaning head is movable transversely or obliquely to the first movement direction by the second movement unit along a guide that is connected to the first movement unit,
wherein a drive device is provided, the drive device being arranged at at least one of the first movement unit and the second movement unit and the first movement unit being automatically movable in dependence on a position of the second movement unit by the drive device,
wherein the drive device comprises a mechanical drive device, the mechanical drive device being provided at the second movement unit and the first movement unit being drivable with the mechanical drive device to make the movement in the first movement direction on a contact of the first movement unit and the second movement unit,
wherein the mechanical drive device is drive effectively coupled to a drive of the second movement unit, and
wherein the mechanical drive device comprises a gear that is in engagement with a drive element of a drive of the first movement unit on a contact of the first movement unit and the second movement unit.

21. The apparatus in accordance with claim 20,
wherein the cleaning head is arranged at the second movement unit.

22. An apparatus for cleaning a surface bounded by a frame that includes a first side end and an opposite second side end, the apparatus comprising:
at least one cleaning head that has at least one cleaning member that can be set into rotation, and
a movement device for moving the cleaning head over at least a part of the surface to be cleaned,
wherein the movement device has a first movement unit that only engages with the first side end of the frame and the first movement unit being movable in a first movement direction and a second movement unit, wherein the cleaning head is movable transversely or obliquely to the first movement direction by the second movement unit along a guide that is connected to the first movement unit,
wherein the guide is pivotable relative to the first movement unit, and
wherein a drive device is provided, the drive device being arranged at at least one of the first movement unit and the second movement unit and the first movement unit being automatically movable in dependence on a position of the second movement unit by the drive device.

23. The apparatus in accordance with claim 22,
wherein the cleaning head is arranged at the second movement unit.

24. An apparatus for cleaning a surface bounded by a frame that includes a first side end and an opposite second side end, the apparatus comprising:
at least one cleaning head that has at least one cleaning member that can be set into rotation, and
a movement device for moving the cleaning head over at least a part of the surface to be cleaned,
wherein the movement device has a first movement unit that only engages with the first side end of the frame and the first movement unit being movable in a first movement direction and a second movement unit, wherein the cleaning head is movable transversely or obliquely to the first movement direction by the second movement unit along a guide that is connected to the first movement unit,
wherein the guide is length variable, and
wherein a drive device is provided, the drive device being arranged at at least one of the first movement unit and the second movement unit and the first movement unit being automatically movable in dependence on a position of the second movement unit by the drive device.

25. The apparatus in accordance with claim 24,
wherein the cleaning head is arranged at the second movement unit.

26. The apparatus in accordance with claim 24, wherein the at least one cleaning member is a brush.

\* \* \* \* \*